US011414355B2

(12) United States Patent
Sheedy et al.

(10) Patent No.: US 11,414,355 B2
(45) Date of Patent: Aug. 16, 2022

(54) SYSTEMS AND METHODS FOR ADDITIVELY MANUFACTURED CERAMIC COMPOSITES

(71) Applicant: UNITED TECHNOLOGIES CORPORATION, Farmington, CT (US)

(72) Inventors: Paul Sheedy, Bolton, CT (US); John A. Sharon, West Hartford, CT (US); Wayde R. Schmidt, Pomfret Center, CT (US); Neal Magdefrau, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/361,040

(22) Filed: Mar. 21, 2019

(65) Prior Publication Data

US 2020/0299200 A1    Sep. 24, 2020

(51) Int. Cl.
*B32B 18/00* (2006.01)
*C04B 35/80* (2006.01)
(Continued)

(52) U.S. Cl.
CPC ............ *C04B 35/645* (2013.01); *B22F 5/009* (2013.01); *B22F 7/008* (2013.01); *B33Y 70/00* (2014.12); *B33Y 80/00* (2014.12); *C04B 35/571* (2013.01); *C04B 35/62873* (2013.01); *C04B 35/83* (2013.01); *C04B 2235/5244* (2013.01);
(Continued)

(58) Field of Classification Search
CPC .......... B22F 5/009; B22F 7/008; B33Y 70/00; B33Y 80/00; C04B 35/645; C04B 35/571; C04B 35/62873; C04B 35/83; C04B 2235/5244; C04B 2235/96; C04B 2235/666; C04B 2237/32
See application file for complete search history.

(56) References Cited

U.S. PATENT DOCUMENTS 9,931,818 B1 *   4/2018   Parolini .................. C04B 35/80
2001/0026868 A1  10/2001  Hanzawa et al.
(Continued)

FOREIGN PATENT DOCUMENTS

CN          105016759       11/2015

OTHER PUBLICATIONS

"Composite Material", Moses Dhilipkumar, Technical World, Jul. 6, 2013, http://latesttechnology-world.blogspot.com/2013/07/composite-material.hlml (Dhilipkumar) (Year: 2013).*
(Continued)

*Primary Examiner* — Daniel J. Schleis
*Assistant Examiner* — Kevin C T Li
(74) *Attorney, Agent, or Firm* — Snell & Wilmer L.L.P,

(57) ABSTRACT

A turbine engine component may comprise a Ceramic Matrix Composite (CMC) structure including a plurality of nominally dense plies, wherein each of the plurality of the nominally dense plies are bonded by at least one of a Field Assisted Sintering Technique (FAST), a Spark Plasma Sintering (SPS), or a localized heating at a bonding interface. The turbine engine component may include an airfoil extending between a first platform and a second platform, wherein the airfoil, the first platform, and the second platform define the CMC structure.

17 Claims, 10 Drawing Sheets

(51) Int. Cl.
- *C04B 37/00* (2006.01)
- *C04B 35/645* (2006.01)
- *B33Y 70/00* (2020.01)
- *B33Y 80/00* (2015.01)
- *B22F 5/00* (2006.01)
- *B22F 7/00* (2006.01)
- *C04B 35/571* (2006.01)
- *C04B 35/628* (2006.01)
- *C04B 35/83* (2006.01)

(52) U.S. Cl.
CPC .... *C04B 2235/666* (2013.01); *C04B 2235/96* (2013.01); *C04B 2237/32* (2013.01)

(56) References Cited

U.S. PATENT DOCUMENTS

| | | | | |
|---|---|---|---|---|
| 2002/0076541 A1* | 6/2002 | Jarmon | ............ | F01D 5/186 428/312.6 |
| 2006/0147688 A1* | 7/2006 | Subramanian | ........ | C04B 35/565 428/292.1 |
| 2015/0003997 A1* | 1/2015 | Mironets | ............ | B22F 5/009 416/241 R |
| 2015/0299052 A1 | 10/2015 | Allemand et al. | | |
| 2015/0377046 A1* | 12/2015 | Duelm | ............ | F01D 5/286 415/200 |
| 2017/0320784 A1 | 11/2017 | Pope | | |
| 2018/0072631 A1 | 3/2018 | Pope | | |
| 2018/0244583 A1 | 8/2018 | Golling et al. | | |
| 2018/0328189 A1 | 11/2018 | Frey et al. | | |
| 2018/0370158 A1* | 12/2018 | Gallier | ............ | B29D 99/0028 |

OTHER PUBLICATIONS

"The Effect of Fiber Volume Fraction in Hipercomp SiC—SiC Composites", Daniel G. Dunn, A Thesis Submitted to the Faculty of Alfred University, Sep. 2010, https://aura.alfred.edu/bitstream/handle/10829/7361/2010_dunn_phd_cer.pdf?sequence=1 (Dunn)(Year: 2010).*

"Composite Material", Moses Dhilipkumar, Technical World, Jul. 6, 2013, http://latesttechnology-world.blogspot.com/2013/07/composite-material.html (Dhilipkumar) (Year: 2013).*

European Patent Office, European Search Report dated Jul. 20, 2020 in Application No. 20162106.7.

* cited by examiner

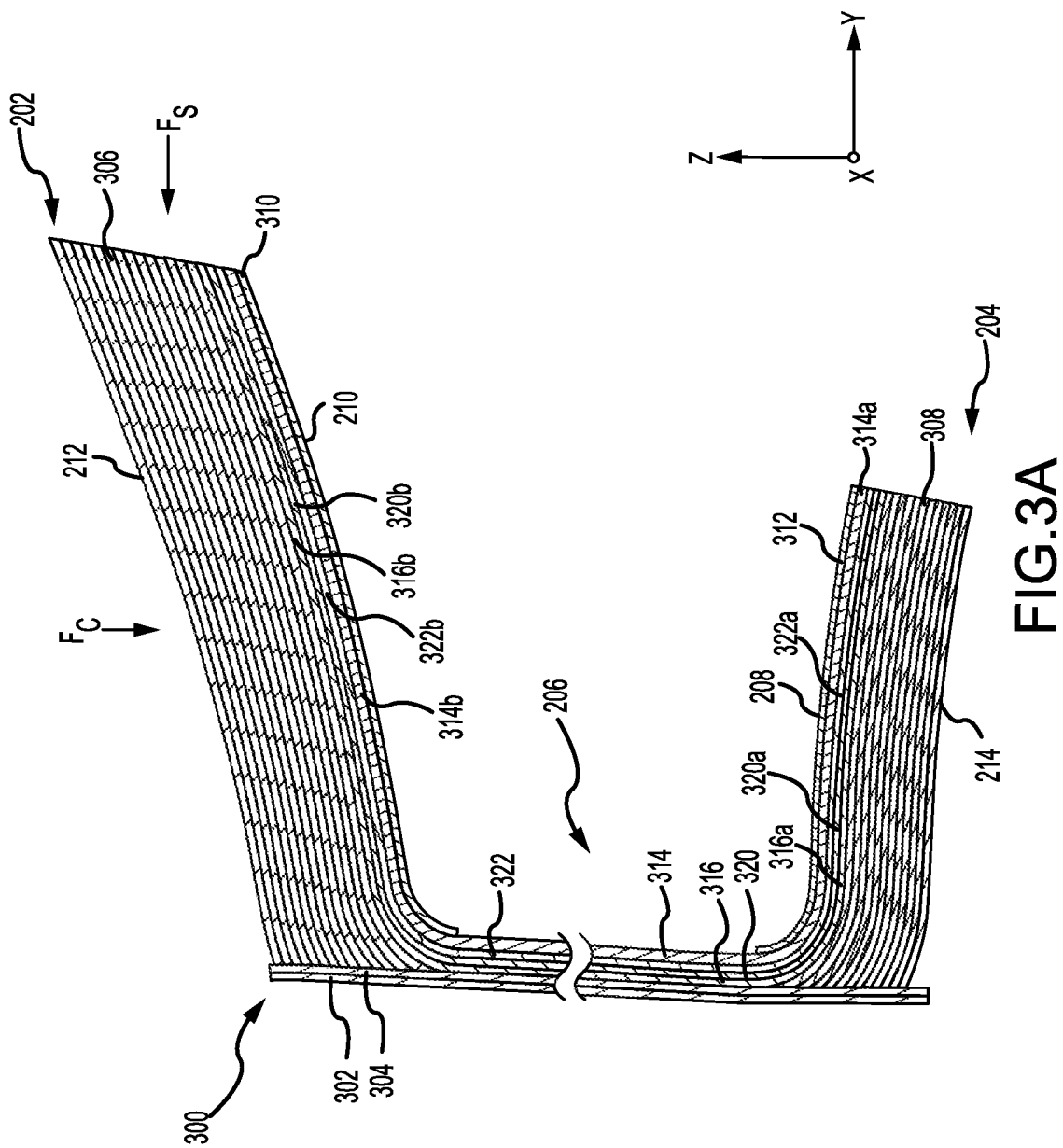

SYSTEMS AND METHODS FOR ADDITIVELY MANUFACTURED CERAMIC COMPOSITES

FIELD

The disclosure relates generally to ceramic matrix composite (CMC) structures, and more particularly to CMC structures of turbine components in gas turbine engines such as stator vanes.

BACKGROUND

Typical Ceramic Matrix Composite (CMC) structures comprise a plurality of either fiber based plies or foam structures layered into a preform which may then be densified and machined to a final form. Traditional fabrication of CMC structures tend to rely on processes including Chemical Vapor Infiltration (CVI), Melt Infiltration (MI), and Polymer Infiltration and Pyrolysis (PIP) each independently or in conjunction for densification of the CMC structure. However, the present techniques are limited in their ability to produce high temperature CMC structures (i.e., materials capable of withstanding 2400° F. or above). Traditional bulk densification of CMC preforms tends to induce thermal stresses, mechanical stresses, shrinkage, etc. with such issues generally increasing in proportion to the preform thickness (e.g., a number of plies). Furthermore, processing time is increased, for example, as a function of diffusion or infiltration distance for gasses and/or liquids applied to the preform in the densification processes.

SUMMARY

In various embodiments the present disclosure provides a turbine engine component comprising, a Ceramic Matrix Composite (CMC) structure including a plurality of nominally dense plies, wherein each of the plurality of the nominally dense plies are bonded by at least one of a Field Assisted Sintering Technique (FAST), a Spark Plasma Sintering (SPS), or a localized heating at a bonding interface.

In various embodiments, the turbine engine component includes an airfoil extending between a first platform and a second platform, wherein the airfoil, the first platform, and the second platform define CMC structure. In various embodiments, the airfoil includes a first shear tube extending relatively orthogonal to the first platform and the second platform, wherein the first shear tube extends through the first platform and the second platform. In various embodiments, the plurality of nominally dense plies includes an interply feature. In various embodiments, the plurality of nominally dense plies includes an interface layer. In various embodiments, the CMC structure is characterized by a gradation of the CMC composition of the plurality of plies along a gradient from an ultra high temperature CMC composition to a relatively lower temperature CMC composition. In various embodiments, the gradation of the CMC composition is defined between an aerodynamic surface and a core layer of the vane. In various embodiments, the interply feature comprises at least one of a cooling channel, a void, a machined feature, an additively manufactured feature, a monofilament strand, or a reinforcement feature. In various embodiments, the interface layer comprises at least one of a particulate, a chopped fiber, a nanotube, or a slurry. In various embodiments, the CMC structure comprises greater than 60 percent by volume of fiber.

In various embodiments, the present disclosure provides an article of manufacture comprising a Ceramic Matrix Composite (CMC) structure including a plurality of nominally dense plies, wherein each of the plurality of the nominally dense plies are bonded by at least one of a field Assisted Sintering Technique (FAST), a Spark Plasma Sintering (SPS), or a localized heating at a bonding interface.

In various embodiments, at least one of the plurality of nominally dense plies is densified to generate an airfoil curvature. In various embodiments, the plurality of nominally dense plies includes an interply feature. In various embodiments, the plurality of nominally dense plies includes an interface layer. In various embodiments, the CMC structure is characterized by a gradation of the CMC composition of the plurality of plies along a gradient from an ultra high temperature CMC composition to a relatively lower temperature CMC composition. In various embodiments, the CMC structure comprises one of face bonded and edge bonded nominally dense plies. In various embodiments, the interply feature comprises at least one of a cooling channel, a void, a machined feature, an additively manufactured feature, a monofilament strand, or a reinforcement feature. In various embodiments, the interface layer comprises at least one of a particulate, a chopped fiber, a nanotube, or a slurry. In various embodiments, the CMC structure comprises greater than 60 percent by volume of fiber.

In various embodiments, the present disclosure provides a method of manufacturing a CMC structure comprising densifying a feedstock ply to generate a nominally dense ply, assembling a plurality of nominally dense plies to generate a preform structure, and bonding the preform structure via at least one of a FAST or SPS process. In various embodiments, the CMC structure is characterized by a gradation of the CMC composition of the plurality of nominally dense plies along a gradient from an ultra high temperature CMC composition to a relatively lower temperature CMC composition.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3A illustrates a cross section of a stator vane having a shear tube, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
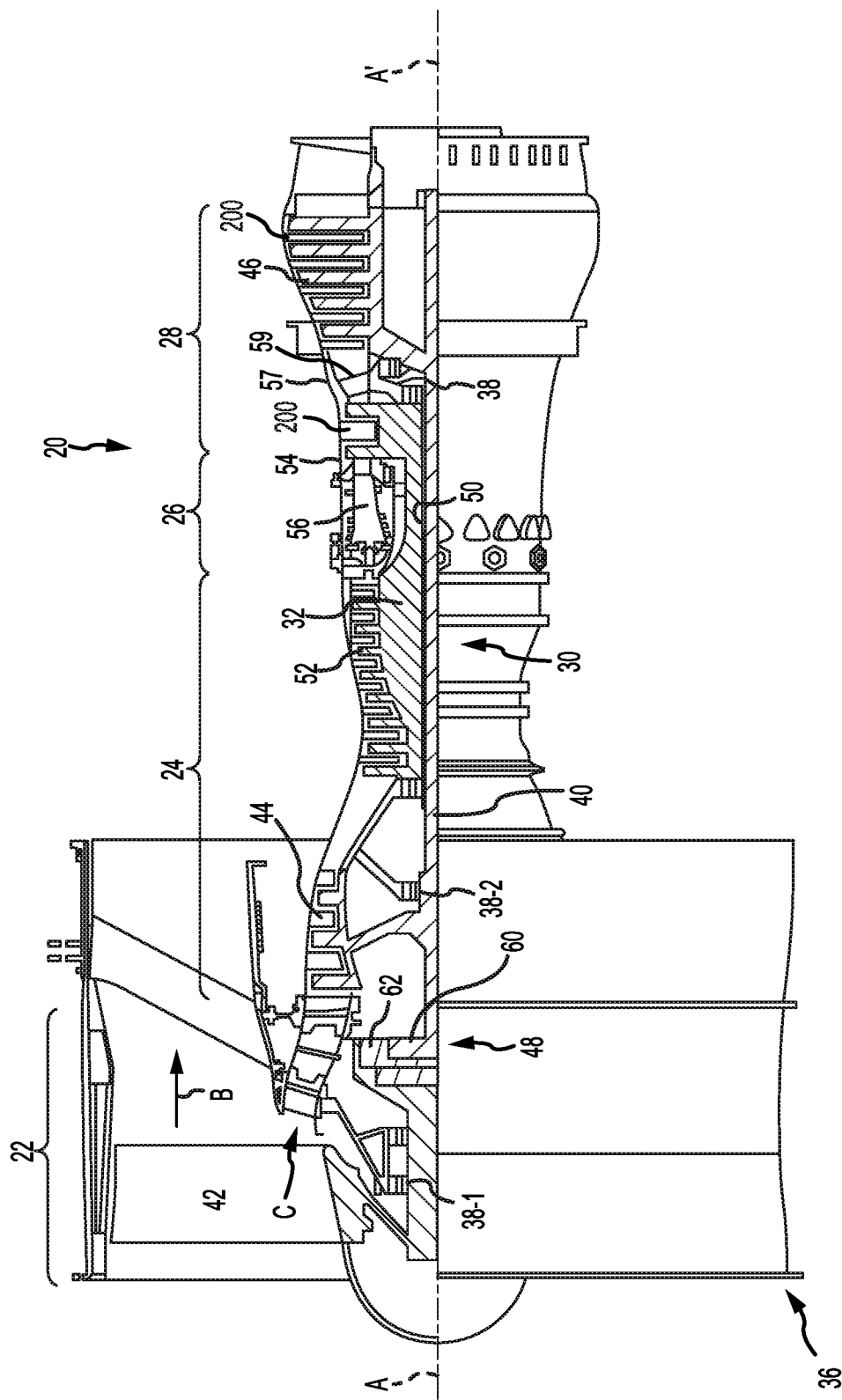
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, low-bypass turbofans, high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by a rotor.

Figure 2:
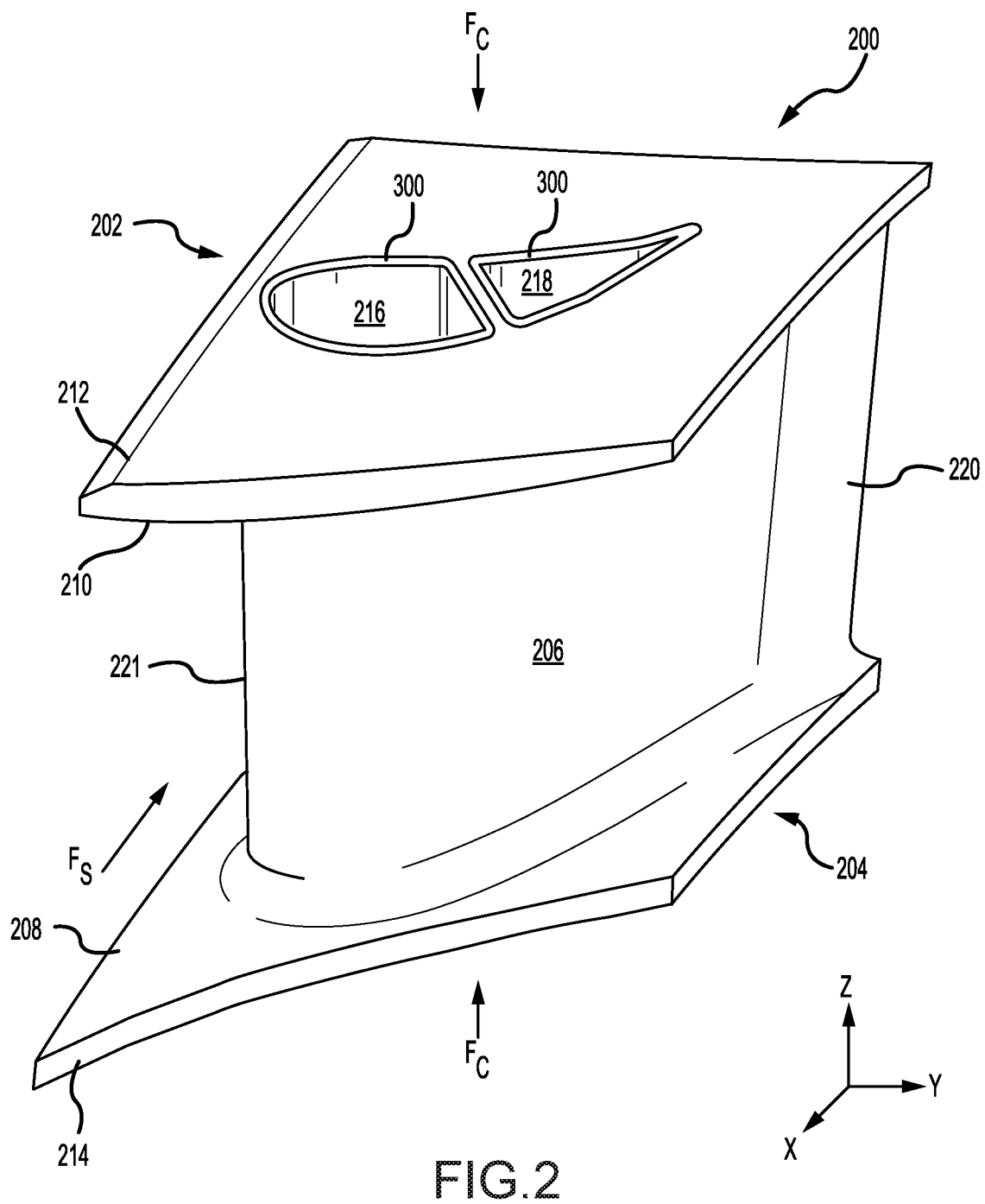
FIG. 2 illustrates a stator vane having a shear tube, in accordance with various embodiments.

According to various embodiments and with reference to FIGS. 1 and 2, a CMC structure may be a turbine engine component (e.g, a hot and/or cold section component) such as stator vane 200 manufactured according to the techniques described herein is illustrated with XYZ-axes provided for reference. Although depicted in FIG. 2 as a stator vane, the processes and techniques described herein are applicable to any number of CMC structures such as, for example, airfoils, blades, vanes, disks, nozzles, diffusers, combustors, seals, rotors, cases, heatshields, beams, plates, and/or any other suitable article of manufacture. Stator vane 200 comprises an airfoil 206 extending between an inner gas path surface 208 of a first platform 204 (i.e. an inner platform) and an outer gas path surface 210 of a second platform 202 (i.e. an outer platform). Airfoil 206 has a chord length defined between a leading edge 221 and a trailing edge 220. The first platform 204 is defined between the inner gas path surface 208 and inner platform surface 214 and, in like regard, the second platform 202 is defined between the outer gas path surface 210 and the outer platform surface 212. In various embodiments, one or more cores such as first core 216 and second core 218 may extend radially (along the Z-axis) through the airfoil 206. The cores 216 and 218 may open through outer platform surface 212 of second platform 202 and inner platform surface 214 of first platform 204. In this regard, the inner platform surface 214 and the outer platform surface 212 may be in fluid communication through the first core 216 and second core 218. During gas turbine engine 20 operation, stator vane 200 may experience compressive loading force $F_c$ in the radial direction (along the Z-axis) and may also experience aerodynamic shear loading $F_s$ in the XY-plane.

Figure 3B:
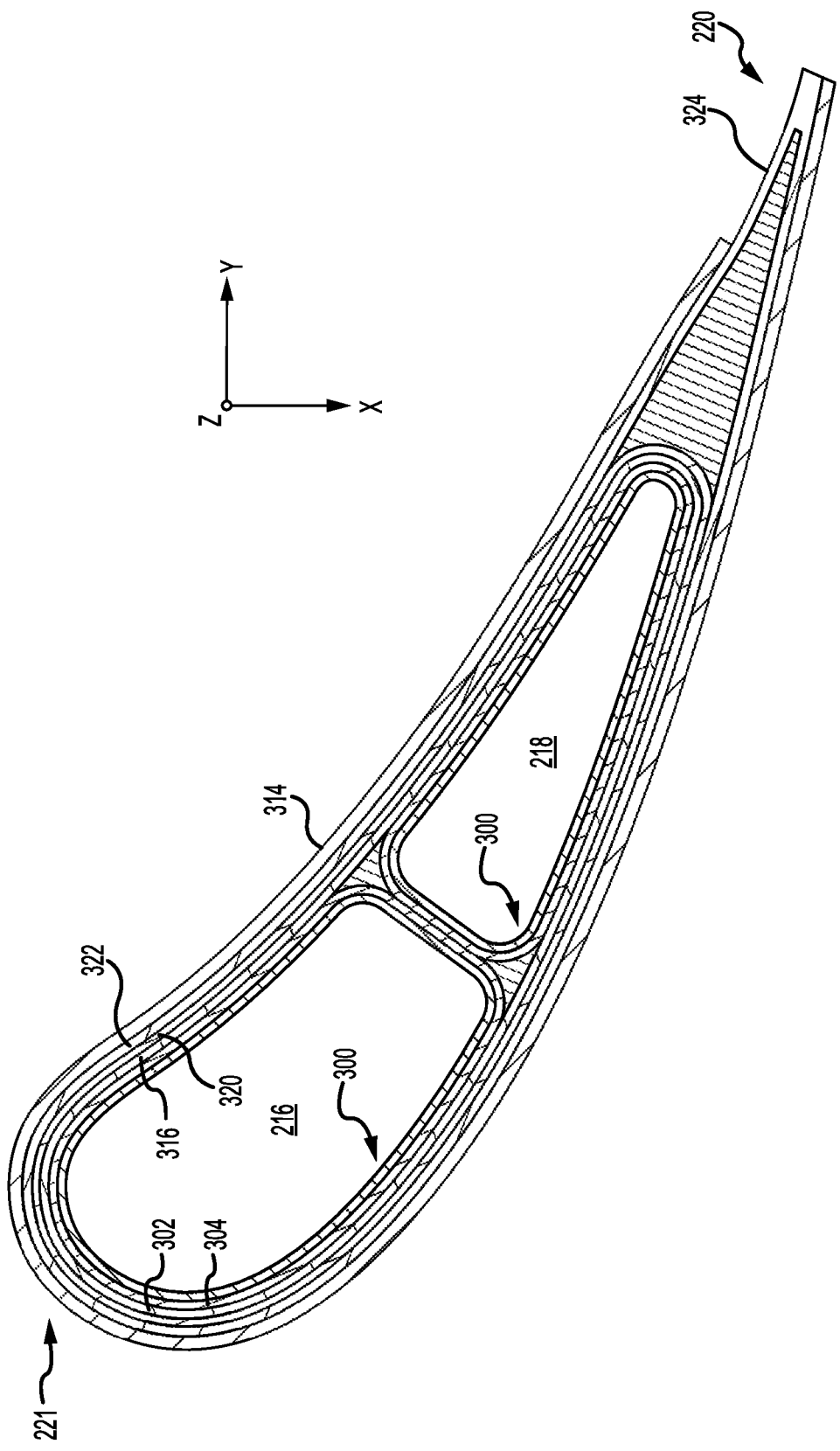
FIG. 3B illustrates a cross section of an airfoil having a shear tube, in accordance with various embodiments

In various embodiments and with additional reference to FIGS. 3A and 3B, stator vane 200 comprises a plurality of stacked, layered, and/or wrapped matrix plies and/or weaves. Stator vane 200 may be a Ceramic Matrix Composite (CMC) material such as, for example, one of a silicon-carbide/silicon-carbide matrix, carbon/carbon matrix, carbon/silicon-carbide matrix, alumina matrix, mullite matrix, or a zirconium diboride matrix. In various embodiments, a CMC material may comprise one or more of borides, carbides, oxides, and/or nitrides. In various embodiments the borides may be selected among a group comprising: $ZrB_2$, $HfB_2$, $VB_2$, $TiB_2$, $TaB_2$, $TaB$, $NbB_2$, $NbB$, $VB_2$, $TiB_2$, $CrB_2$, $Mo_2B_5$, $W_2B_5$, $Fe_2B$, $FeB$, $Ni_2B$, $NiB$, $LaB_6$, $CoB$, $Co_2B$, or any other refractory boride. In various embodiments, the carbides may be selected among a group comprising: $SiC$, $HfC$, $ZrC$, $C$, $B_4C$, $SiOC$, $TiC$, $WC$, $Mo_2C$, $TaC$, $NbC$, or any other refractory carbide. In various embodiments, the oxides may be selected among a group comprising: $HfO_2$, $ZrO_2$, $Al_2O_3$, $SiO_2$, class compositions including aluminosilicates, borosilicates, lithium aluminosilicates (LAS), magnesium aluminosilicates, barium magnesium aluminosilicates (BMAS), calcium aluminosilicates and other silica containing high temperature glasses, and/or other mixed metal oxides. In various embodiments, the nitrides may be selected among a group comprising: $AlN$, $Si_3N_4$, $TaN$, $TiN$, $TiAlN$, $W_2N$, $WN$, $WN_2$, $VN$, $ZrN$, $BN$, $HfN$, $NbN$, or any other refractory nitrides. In various embodiments, the CMC material may comprise mixed refractory nonoxides such as, for example, $SiCN$.

FIG. 3A illustrates stator vane 200 in partial cross section through the ZY plane viewed along the X-axis. FIG. 3B illustrates a cross section of airfoil 206 of stator vane 200 through the XY plane viewed along the Z-axis. First platform 204 comprises a first plurality of platform plies 308 layered relatively coplanar with the XY plane and stacked (along the Z-axis). In a like manner, the second platform 202 comprises a second plurality of platform plies 306 layered relatively coplanar with the XY plane and stacked (along the Z-axis). The platform plies 306 and 308 may tend to be relatively resistant to compressive loading $F_c$ but, in response to shear loading $F_s$ applied relatively in plane to the platform plies 306 and 308, may tend to delaminate.

Airfoil 206 may be built up around one or more shear tubes 300 which may define the circumference of the first core 216 and the second core 218. Shear tubes 300 may comprise one or more shear tube layers such as first shear tube layer 302 and second shear tube layer 304 which wrap around the Z-axis and extend along the Z-axis through the airfoil 206, the first platform 204 and the second platform 202. Stated another way, the shear tubes 300 are disposed relatively orthogonally (i.e. within 45°) to the first plurality of platform plies 308 and the second plurality of platform plies 306. In this regard, the shear tubes 300 may be relatively orthogonal to the first platform 204 and the second platform 202 and tend to resist aerodynamic shear force $F_s$ tending thereby to inhibit delamination of the first plurality of platform plies 308 and the second plurality of platform plies 306. In various embodiments, a shear tube 300 may be wrapped, braided, and/or a triaxially braided shear tube.

Airfoil 206 may further include one or more overbraid layers which wrap around the Z-axis about the shear tubes 300 such as first overbraid layer 316 and second overbraid layer 320. In various embodiments, the overbraid layers may be a continuous overbraid (e.g., a tube) with first platform ends (316a, 320a) and second platform ends (316b, 320b) feathered out and laid relatively in plane with the first the first plurality of platform plies 308 and the second plurality of platform plies 306 thereby forming a portion of the respective platform. In like regard, airfoil 206 may include a woven overlay 322 (e.g., a Y-weave overlay) about the overbraid layers with ends (322a, 322b) of the woven overlay 322 similarly feathered and laid relatively in plane with the first plurality of platform plies 308 and the second plurality of platform plies 306 and proximate first platform ends (316a, 320a) and second platform ends (316b, 320b).

An aerodynamic layer 314 wraps over the woven overlay 322, forming the aerodynamic surface of airfoil 206 with ends (314a, 314b) similarly feathered and laid relatively in plane with the first plurality of platform plies 308 and the second plurality of platform plies 306 and respectively contacting the ends (322a, 322b) of the woven overlay 322. In various embodiments, aerodynamic layer 314 may not fully overwrap the woven overlay 322 and may expose a portion 324 of the woven overlay 322 proximate the trailing edge 220 of airfoil 206. In various embodiments an inner gas path layer 312 may be layered over first platform end 314a of aerodynamic layer 314 and define the inner gas path surface 208. In like regard, an outer gas path layer 310 may be layered over the second platform end 314b of aerodynamic layer 314 and define the outer gas path surface 210. In this regard, airfoil 206 may be built up of multiple layers and a shear tube such as shear tube 300 may comprise any layer or any number of layers of an airfoil such as airfoil 206.

Figure 4:
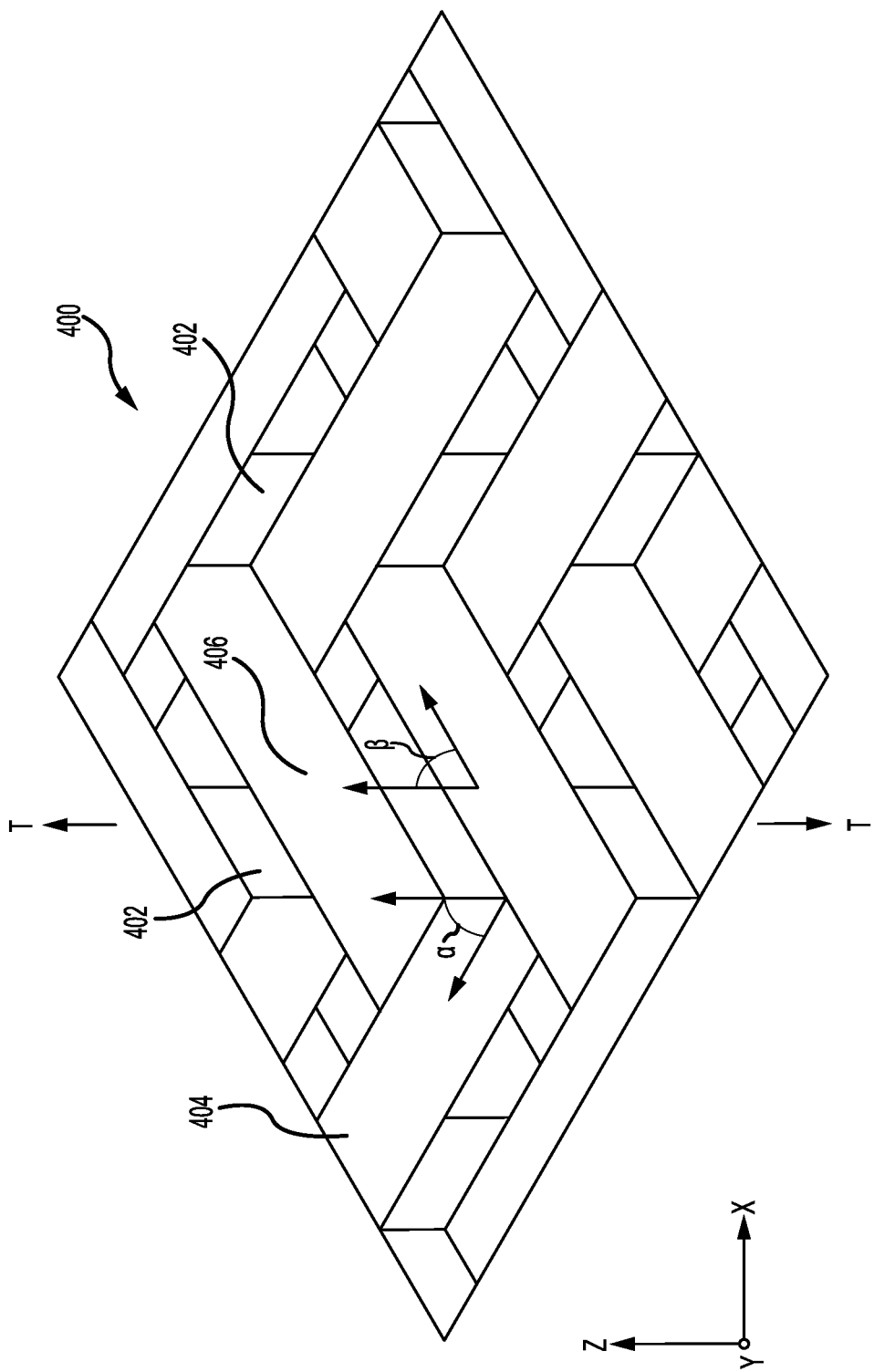
FIG. 4 illustrates a section of triaxially braided layer, in accordance with various embodiments.

With additional reference to FIG. 4, a section 400 of a triaxially braided layer is illustrated in accordance with various embodiments showing details of the braided fibers. Section 400 includes a plurality of axial fibers 402 which are wrapped relatively between first bias fibers 404 and second bias fibers 406. The intersection between the first bias fibers 404 and the axial fibers 402 define a first bias angle α and, in like regard, the intersection between the second bias fibers 406 and the axial fibers 402 define a second bias angle β. The first bias angle and the second bias angle may be configured to improve the material properties of a layer. In various embodiments, bias angle α and bias angle β may be equal. In various embodiments bias angle α may be between 20° and 70° and bias angle β may be between 20° and 70°.

In various embodiments, the first shear tube layer 302 and the second shear tube layer 304 may comprise triaxially braided layers having the axial fibers 402 oriented radially (parallel the Z-axis). In this regard shear tube 300 may be a triaxially braided shear tube. In various embodiments, first overbraid layer 316 and second overbraid layer 320 may comprise triaxially braided layers having the axial fibers 402 oriented axially (parallel the X-axis). In this regard, aerodynamic shear force $F_s$ may be transferred compressively through the layers of airfoil 206, first platform 204 and second platform 202 and, in response, tending to induce a bending and in plane shear force T in fibers (402, 404, 406) of the triaxially braided shear tubes 300 which tends to resist the transmitted aerodynamic shear force $F_s$. In this regard, a closed section of shear tubes 300 tends to increase its shear loading capacity thereby tending to enhance the overall shear strength of CMC structures such as vane 200.

Figure 5B:
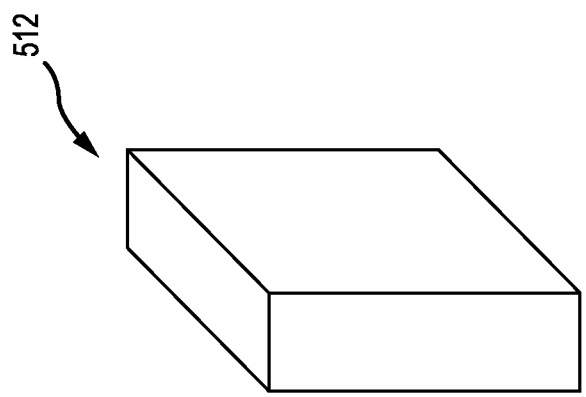
FIG. 5B illustrates a CMC structure comprising a plurality of nominally dense plies, in accordance with various embodiments.
Figure 5A:
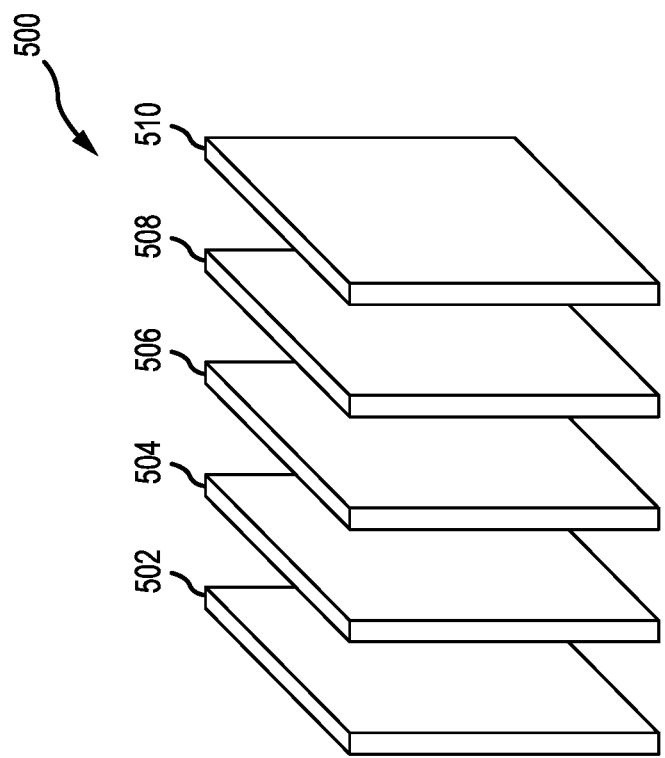
FIG. 5A illustrates a plurality of nominally dense plies of a CMC structure, in accordance with various embodiments.

With additional reference to FIG. 5A a first plurality of nominally dense plies 500 of a CMC structure are illustrated and arranged for assembly. Each of the plies (502, 504, 506, 508, 510) may correspond, for example, to respectively adjacent layers of a CMC structure such as aerodynamic layer 314, woven overlay 322, second overbraid layer 320, first overbraid layer 316, and second shear tube layer 304. Each of the plies (502, 504, 506, 508, 510) are densified to a nominal density prior to arrangement for assembly. In various embodiments, the feedstock plies may be densified by any of those densification techniques known to those skilled in the art such as, for example, PIP, CVI, MI, Chemical Vapor Deposition (CVD), Atomic Layer Deposition (ALD), and/or the like. In a preferred but non-limiting embodiment, ALD may be used to enable a more complete densification of the feedstock plies.

The ALD process works by first adsorbing a nominal (mono)layer of a precursor on the surface(s) of a feedstock (e.g., a fiber based structure such as a ply, or layer, or a foam structure), purging the excess precursor, and then introducing a second reactant which converts the adsorbed layer to the desired chemistry. This results in a self-limiting, non-line-of-sight deposition of substantially uniform, pinhole-free, conformal coatings even on substrates with high aspect ratio (e.g. greater than 1000:1) features. The reaction conditions are chosen to achieve the best combination of precursor adsorption and subsequent reaction, with typical growth per cycle in the range of 0.5 to 1 Angstrom. Compositions can vary from metals to oxides and other ceramics (e.g. borides, carbides, nitrides and/or the like), multilayer structures and even polymers such as, for example, by means of Molecular Layer Deposition (MLD). Although tending to have comparative low deposition rates to other densification processes, known ALD coating processes, such as for $Al_2O_3$, may be used to deposit several tens of microns of material. Additionally, a methodology known as 'spatial ALD'—whereby the feedstock moves through different reaction zones of a reactor (vs. 'temporal ALD' where the reactants are purged in/out of a reactor containing the feedstock)—may tend to increase throughput and tend to enable roll-to-roll processing having deposition rates on the order of microns per minute. In this regard, the plurality of nominally dense single plies 500 may be produced utilizing higher throughput ALD techniques such as spatial ALD. In various embodiments, feedstocks may be densified via any suitable rapid processing densification technique in continuous and/or batch operations.

In various embodiments, the ALD process tends to enable substantially uniform build-up of material on exposed surfaces, throughout high aspect ratio substrates (including fibers, microcracks, and gaps) and even among several preform parts in a deposition chamber. Of the presently known densification processes discussed herein, it is believed that ALD tends to enable relatively the most uniform filling of a CMC structure (or any fiber, particulate, or other type of preform/substrate/feedstock) and therefore tends to inhibit 'canning off' or maximize a reduction in the 'canning off' of CMC feedstock based purely on geometric considerations. Stated another way, certain CMC feedstock preforms may possess geometries tending to promote densification at the feedstock surface, tending thereby to accelerate surface deposition and tending thereby to inhibit interior densification of the preform (e.g., by closing gas paths to the preform interior). In this regard, the interior of a preform may be 'canned off' from the surface layers tending thereby to seal it from further densification.

As compared to CVI, the deposition rate for ALD (with sufficient time for diffusion) does not change due to the process being an inherently self-limiting surface reaction. A CVD densification process, for example, may result in a density gradient from outside-in (i.e. greater purely from diffusional processes) and, due to geometrical constraints, may result in a more rapid reaction and 'canning-off' of a pore structure of the feedstock. In contrast, ALD tends to continue to uniformly and completely fill the pore structure due to being a series of self-limiting surface reactions which do not result in non-uniform nucleation and growth of the deposited material as is seen in CVI processes. In various embodiments, utilizing a reduced feedstock volume may tend to improve part densification. In various embodiments, the ALD process tends to enable manufacture of CMC structures with relatively higher fiber or other reinforcement (e.g. particulate) loading (i.e., structures comprising greater than 60% by volume fiber/other reinforcement) than the other densification processes described herein. In this regard, ALD densification of feedstock plies may tend to improve the mechanical properties of CMC structures. In various embodiments, feedstock plies may be cut to shape or laid up in a mold prior to densification thereby enabling production of nominally dense plies of arbitrary shape or curvature. For example, individual feedstock plies may be densified in a mold having the curvature of an airfoil to generate a nominally dense ply having an airfoil curvature.

In various embodiments as shown in FIG. 5B, each of the nominally dense plies (502, 504, 506, 508, 510) may be layered and bonded at contact interfaces relatively between each of the plies to form a uniform CMC structure 512 comprising the bonded layers of nominally dense plies (502, 504, 506, 508, 510). For example ply 502 may be contacted with ply 504 at a contact interface and bonded via at least one of a Field Assisted Sintering Technique (FAST), Spark Plasma Sintering (SPS), or similar method which facilitates localized heating at the contact interfaces to be bonded (i.e., a bonding interface). Each of the plies (502, 504, 506, 508, 510) may similarly be bonded via the localized heating bonding process to build up the CMC structure 512. In various embodiments, an interface layer may be applied between any or each of the plies (502, 504, 506, 508, 510) to promote FAST/SPS bonding and enhance interlaminar properties (e.g., mechanical, thermal, electrical, and/or the like) of the CMC structure 512. The interface layer may comprise a particulate, a chopped fiber, a nanotube, a slurry, and/or the like. Exemplary particulate compositions include those previously described for carbides, oxides, nitrides and borides, and include morphologies ranging from spherical or acicular to elongated, and sizes ranging from nanometer or submicron to tens of microns. Exemplary chopped fibers include carbon, silicon carbide, silicon nitride, silicon oxycarbide and oxides. Exemplary slurries may be aqueous or organic solvent based suspensions/dispersions of ceramic, metal or carbonaceous particulates.

Figure 6B:
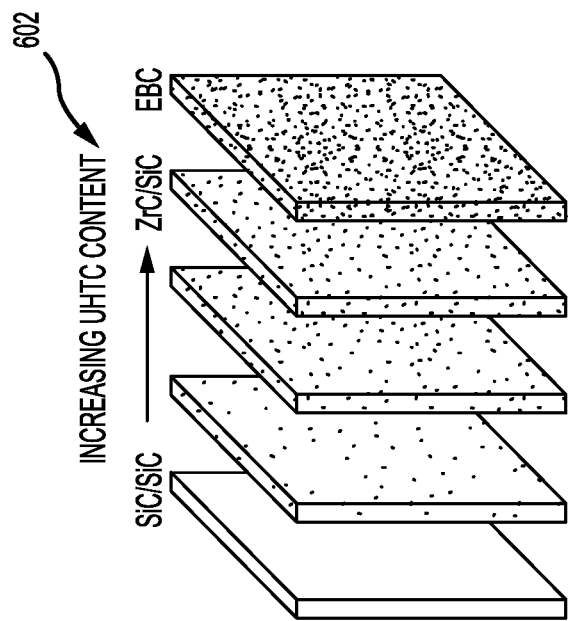
FIG. 6B illustrates a plurality of nominally dense plies of a CMC structure, in accordance with various embodiments
Figure 6A:
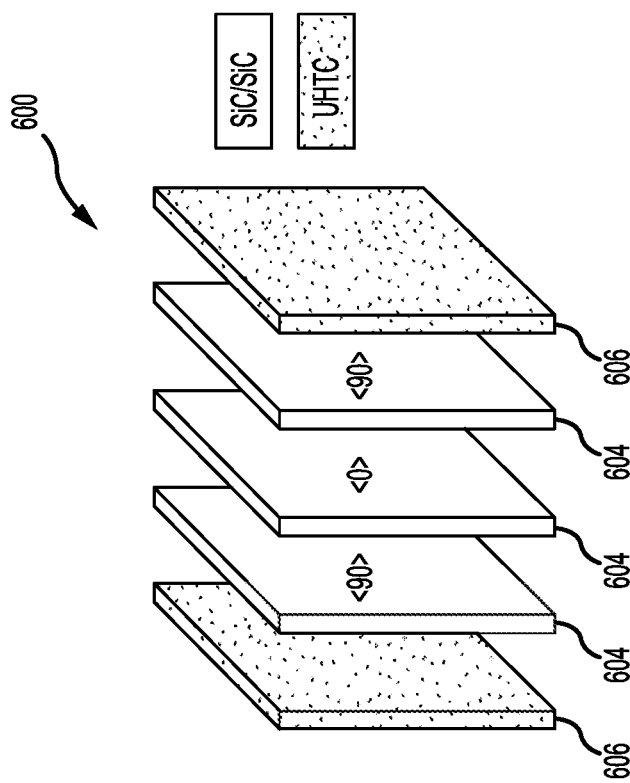
FIG. 6A illustrates a plurality of nominally dense plies of a CMC structure, in accordance with various embodiments.

With additional reference to FIGS. 6A and 6B a second plurality of nominally dense plies 600 and a third plurality of nominally dense plies 602 are illustrated. Plies 600 and 602 have features, geometries, construction, materials, manufacturing techniques, and/or internal components similar to plies 500. Plies 600 may be bonded to form a sandwich CMC structure defined by core plies 604 (shown in light shade) of a first CMC composition (e.g., a SiC/SiC composition) and face plies 606 (shown in dark shade) of a second CMC composition (e.g., an Ultra High Temperature Ceramic (UHTC) or Environmental Barrier Coating (EBC)/Thermal Barrier Coating (TBC) composition). In various embodiments, a CMC composition may include a monolithic ceramic composition (i.e., non-fiber reinforced). In various embodiments, the core plies may have an alternating fiber orientation whereby the axial fibers (e.g., axial fibers 400) of each of the respectively adjacent plies are set at a non-parallel relative angle. For example, a center core ply may be set as a zero angle (marked <0>) and the axial fibers of each of the respectively adjacent core plies may be orthogonal (marked <90>).

Plies 602 may be bonded to form a gradated CMC structure defined by a gradation between a relatively lower temperature CMC composition and an UHTC CMC composition or EBC/TBC composition. The CMC composition of the plurality of plies may vary along a gradient (illustrated as lighter to darker shades of plies 602) defined from the low temperature CMC plies increasing to the high temperature CMC plies (e.g. an ultra high temperature CMC composition). In various embodiments a gradated CMC structure such as, for example, a combustor, may be optimized to include high temperature CMC compounds proximate a flame front and relatively lower temperature compounds away from the flame front. In another example, a turbine vane or blade may be optimized to comprise the UHTC composition proximate an aerodynamic surface (e.g., aerodynamic layer 314) and the relatively low temperature CMC plies proximate a core layer (e.g., shear tubes 300, first overbraid layer 316, etc.) and a CMC composition gradient of high temperature material therebetween. In this regard, a CMC structure may be optimized for UTHC composition tending thereby to reduce production costs and time while tending to increase mechanical and thermal performance of the CMC structure. As will be appreciated by those skilled in the art, the gradation may be tailored for any number of desirable properties such as, for example coefficient of thermal expansion, mechanical properties such as toughness, hardness, strength, wear performance, density, etc.

Figure 7B:
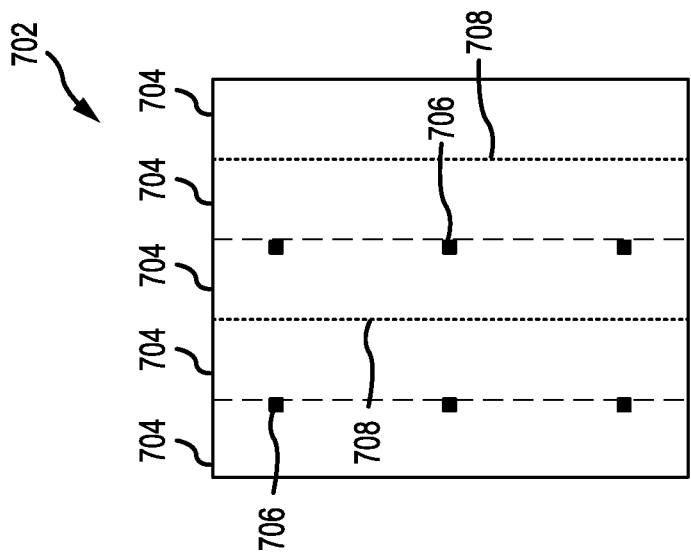
FIG. 7B illustrates a CMC structure comprising a plurality of nominally dense plies, in accordance with various embodiments
Figure 7A:
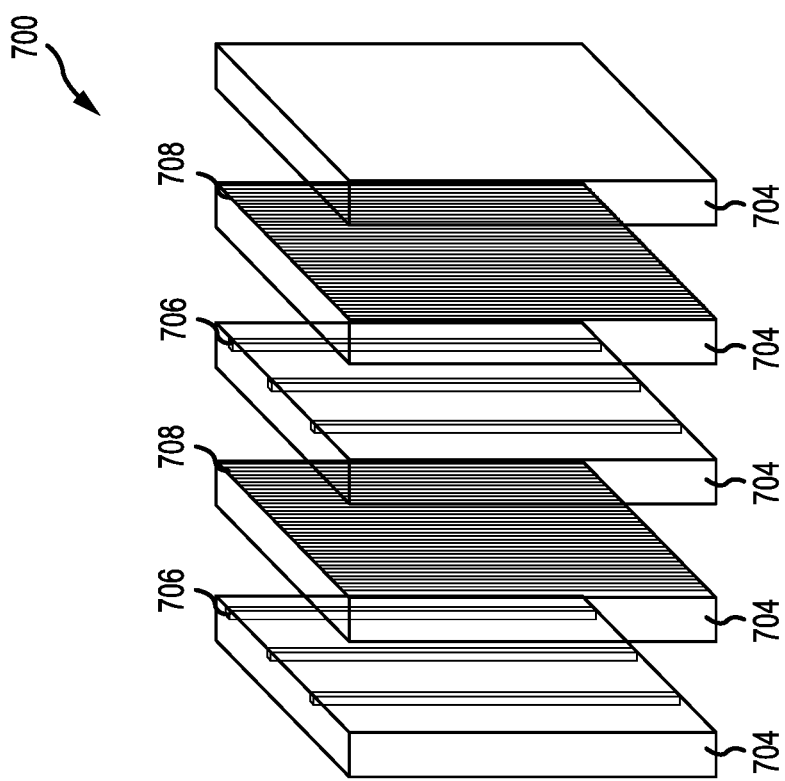
FIG. 7A illustrates a plurality of nominally dense plies of a CMC structure, in accordance with various embodiments

In various embodiments and with reference to FIGS. 7A and 7B a fourth plurality of plies 700 is illustrated having first interply features 706 and second interply features 708. FIG. 7B illustrates an axial view along the interply features of a CMC structure 702 assembled of the plurality of plies 700. The fourth plurality of plies 700 has features, geometries, construction, materials, manufacturing techniques, and/or internal components similar to plies 500, 600, and 602. Each or any of the nominally dense plies 704 of the plurality of plies 700 may include interply (e.g., surface proximate and/or extending through the full ply thickness) features such as voids, machined features, additively manufactured features, or reinforcement features such as, for example, monofilament strands. For example, first interply features 706 may comprise cooling channels machined into the interlaminar face of the nominally dense ply 704. In another example, the second interply features 708 may comprise parallel monofilament strands laid along the interlaminar face of the nominally dense ply 704.

Figure 8:
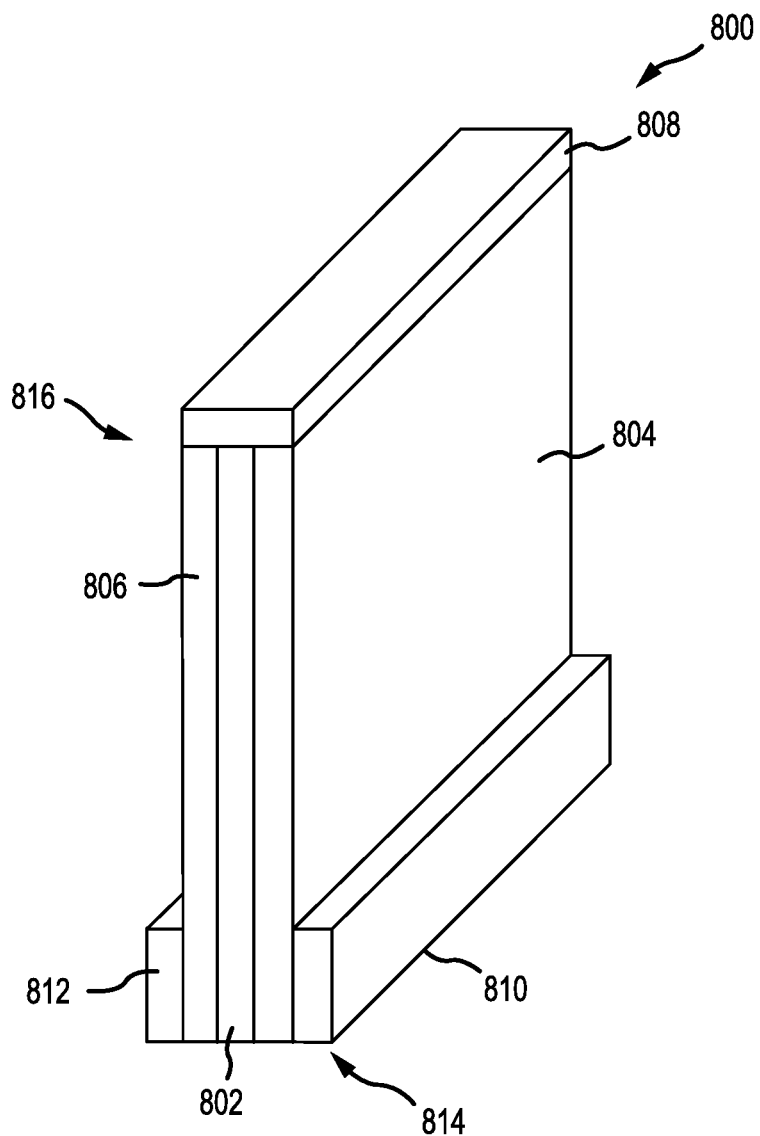
FIG. 8 illustrates a CMC structure comprising a plurality of nominally dense plies, in accordance with various embodiments.

With additional reference to FIG. 8, a CMC structure 800 is illustrated having face bonded and edge bonded plies in accordance with various embodiments. CMC structure 800 comprises a plurality of plies having features, geometries, construction, materials, manufacturing techniques, and/or internal components similar to plies 500, 600, 602, and 700. Core ply 802 comprises a first CMC composition and is sandwiched between a first face ply 804 and a second face ply 806 which are face bonded to the core ply 802. The first face ply 804 comprises a second CMC composition and the second face ply 806 comprises a third CMC composition. The core and face plies (802, 804, 806) extend axially from a base edge 814 to a tip edge 816. A cap ply 808 may be edge bonded along the tip edge 816 of each of the core ply 802 the first face ply 804, and the second face ply 806. The cap ply 808 may comprise a fourth CMC composition. In various embodiments, a first longitudinal bolster ply 810 may be applied to the first face ply 804 proximate the base edge 814. In like regard, a second longitudinal bolster ply 812 may be applied over second face ply 806 opposite the first longitudinal bolster ply 810 and proximate the base edge 814. In various embodiments, the first longitudinal bolster ply 810 and the second longitudinal bolster ply 812 may comprise a fifth CMC composition. In this regard, a functionally graded CMC structure may be constructed of various CMC compositions. Any of the CMC compositions may include a monolithic ceramic composition. For example, a CMC structure including an airfoil may have a leading edge face ply of a CMC composition comprising a fine-grained monolithic ceramic for enhancing erosion and impact performance.

Figure 9:
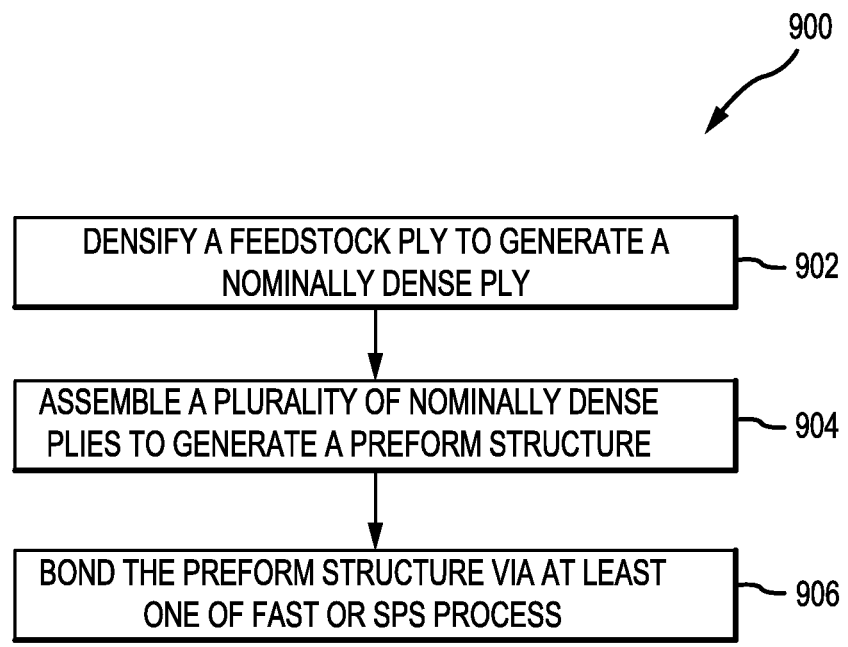
FIG. 9 illustrates a method of manufacturing a CMC structure, in accordance with various embodiments.

With additional reference to FIG. 9, a method 900 of manufacturing a CMC structure may comprise densification of a feedstock ply to generate a nominally dense ply (step 902). In various embodiments, a nominally dense ply may have a density between 90% and 100% of the theoretical maximum density for a CMC composition selected for densification of the feedstock ply. Step 902 may include applying an interply feature to the nominally dense ply.

Method 900 includes assembling a plurality of nominally dense plies to generate a preform structure (step 904). Step 904 may include layering two or more plies in a mold and applying an interface layer between the plies. Method 900 includes bonding the preform structure to generate a CMC structure (step 906). Step 906 includes bonding the preform structure via a FAST process, SPS process, and/or similar method which facilitates a localized heating at the bonding interface. Step 906 may include a second densification process subsequent to FAST/SPS bonding such as, for example, an ALD or CVD densification process. In various embodiments, method 900 includes at least one of finishing machining the CMC structure or applying a surface coating to the CMC structure to generate a finished CMC part.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A turbine engine component, comprising:
   an airfoil extending between a first platform and a second platform,
   the airfoil including shear tubes extending substantially orthogonal to the first platform and the second platform, wherein the shear tubes extend through the first platform and the second platform, wherein the shear tubes define a first core and a second core, wherein the shear tubes are triaxially braided shear tubes,
   wherein the airfoil, the first platform, the second platform, and the shear tubes define a Ceramic Matrix Composite (CMC) structure including a plurality of densified plies,
   wherein the plurality of densified plies includes an interply feature comprising at least one of a cooling channel, a void, a machined feature, an additively manufactured feature, or parallel monofilament strands laid along an interlaminar face of a densified ply,
   wherein each of the plurality of densified plies are bonded by at least one of a Field Assisted Sintering Technique (FAST), a Spark Plasma Sintering (SPS), or a localized heating at a bonding interface.

2. The turbine engine component of claim 1, wherein the plurality of densified plies are densified to a density between 90% and 100% of the theoretical maximum density of a first CMC composition.

3. The turbine engine component of claim 1, wherein the plurality of densified plies includes an interface layer.

4. The turbine engine component of claim 1, wherein the CMC structure is characterized by a gradation of a CMC composition of the plurality of plies along a gradient from a first CMC composition to a second CMC composition.

5. The turbine engine component of claim 4, wherein the gradation of the CMC composition is defined between an aerodynamic surface and a core layer of the turbine engine component.

6. The turbine engine component of claim 3, wherein the interface layer comprises at least one of a particulate, a chopped fiber, a nanotube, or a slurry.

7. The turbine engine component of claim 1, wherein the CMC structure comprises greater than 60 percent by volume of fiber.

8. The turbine engine component of claim 1, wherein at least one of the plurality of densified plies comprises a monolithic ceramic composition.

9. An article of manufacture, comprising:
   an airfoil extending between a first platform and a second platform,
   the airfoil including shear tubes extending substantially orthogonal to the first platform and the second platform, wherein the shear tubes extend through the first platform and the second platform, wherein the shear tubes define a first core and a second core, wherein the shear tubes are triaxially braided shear tubes,
   wherein the airfoil, the first platform, the second platform, and the shear tubes define a Ceramic Matrix Composite (CMC) structure including a plurality of densified plies,
   wherein the plurality of densified plies includes an interply feature comprising at least one of a cooling channel, a void, a machined feature, an additively manufactured feature, or parallel monofilament strands laid along an interlaminar face of a densified ply,
   wherein each of the plurality of densified plies are bonded by at least one of a Field Assisted Sintering Technique (FAST), a Spark Plasma Sintering (SPS), or a localized heating at a bonding interface.

10. The article of manufacture of claim 9, wherein at least one of the plurality of densified plies is densified to generate an airfoil curvature.

11. The article of manufacture of claim 9, wherein the plurality of densified plies are densified to a density between 90% and 100% of the theoretical maximum density of a first CMC composition.

12. The article of manufacture of claim 9, wherein the plurality of densified plies includes an interface layer.

13. The article of manufacture of claim 9, wherein the CMC structure is characterized by a gradation of a CMC composition of the plurality of plies along a gradient from a first CMC composition to a second CMC composition.

14. The article of manufacture of claim 9, wherein the CMC structure comprises one of face bonded and edge bonded nominally dense plies.

15. The article of manufacture of claim 12, wherein the interface layer comprises at least one of a particulate, a chopped fiber, a nanotube, or a slurry.

16. The article of manufacture of claim 9, wherein the CMC structure comprises greater than 60 percent by volume of fiber.

17. A method of manufacturing the CMC structure according to claim 9, the method comprising:
 densifying a feedstock ply to generate a nominally dense ply;
 assembling a plurality of nominally dense plies to generate a preform structure; and
 bonding the preform structure via at least one of a Field Assisted Sintering Technique (FAST), a Spark Plasma Sintering (SPS) process, or a localized heating at a bonding interface.

* * * * *